United States Patent
Gramling et al.

(10) Patent No.: US 8,006,794 B2
(45) Date of Patent: Aug. 30, 2011

(54) KINETIC ENERGY STORAGE DEVICE

(76) Inventors: James T. Gramling, Overland Park, KS (US); James Cornell Martin, Santa Rosa Beach, FL (US)

(*) Notice: Subject to any disclaimer, the term of this patent is extended or adjusted under 35 U.S.C. 154(b) by 0 days.

(21) Appl. No.: 12/771,374

(22) Filed: Apr. 30, 2010

(65) Prior Publication Data

US 2010/0276222 A1    Nov. 4, 2010

Related U.S. Application Data

(60) Provisional application No. 61/174,115, filed on Apr. 30, 2009.

(51) Int. Cl.
*B60K 6/00* (2007.10)

(52) U.S. Cl. .................... 180/165; 475/268

(58) Field of Classification Search ........... 180/65.2, 180/65.1, 65.26, 305, 165; 475/268, 212, 475/8, 267; 701/102, 115, 13; 310/68 B, 310/254.1, 24, 54
See application file for complete search history.

(56) References Cited

U.S. PATENT DOCUMENTS

| | | | | |
|---|---|---|---|---|
| 3,641,843 A * | 2/1972 | Lemmens | ...................... | 475/212 |
| 4,439,989 A * | 4/1984 | Yamakawa | ...................... | 60/718 |
| 4,468,207 A * | 8/1984 | Yoshida | ...................... | 74/411 |
| 4,753,078 A * | 6/1988 | Gardner, Jr. | ...................... | 180/305 |
| 4,891,998 A * | 1/1990 | Tourville | ...................... | 74/48 |
| 4,928,553 A * | 5/1990 | Wagner | ...................... | 475/268 |
| 5,725,429 A * | 3/1998 | Yanagida | ...................... | 464/24 |
| 5,727,388 A * | 3/1998 | Adamides | ...................... | 310/24 |
| 5,921,505 A * | 7/1999 | Spector | ...................... | 701/13 |
| 6,138,527 A * | 10/2000 | Bitterly et al. | ...................... | 74/572.12 |
| 6,373,155 B1 * | 4/2002 | Shimizu et al. | ...................... | 310/68 B |
| 6,424,126 B1 * | 7/2002 | Ohsawa | ...................... | 180/65.1 |
| 6,962,171 B2 * | 11/2005 | Krumm et al. | ...................... | 139/116.2 |
| 7,108,626 B2 * | 9/2006 | Friedmann | ...................... | 475/8 |
| 7,300,385 B2 * | 11/2007 | Cherry et al. | ...................... | 477/181 |
| 7,792,626 B2 * | 9/2010 | Eriksson et al. | ...................... | 701/102 |
| 2008/0223636 A1 * | 9/2008 | Gutsche | ...................... | 180/65.2 |

* cited by examiner

*Primary Examiner* — Hau V Phan
(74) *Attorney, Agent, or Firm* — Dale J. Ream

(57) ABSTRACT

A kinetic energy storage device includes first and second counter-rotating variable flywheels coupled to a differential. A control mechanism coupled to both flywheels allows the moment of inertia of each flywheel to be adjusted so that the flywheels, differentia, and control mechanism operate as a true infinitely variable transmission. The differential includes an output to allow kinetic energy to be extracted from and added to the device. The counter-rotating flywheels provide stability and controllability making the device suitable for use with short duty-cycle vehicle motivation. Also disclosed is a vehicle drive train configured to be driven by said kinetic energy storage device and a fixture for providing initial kinetic energy to the device.

30 Claims, 21 Drawing Sheets

KINETIC ENERGY STORAGE DEVICE

CROSS-REFERENCE TO RELATED APPLICATIONS

This application is based on, and claims priority to, U.S. Provisional Application Ser. No. 61/174,115, filed on Apr. 30, 2009 which is hereby incorporated in its entirety herein by reference.

STATEMENT REGARDING FEDERALLY SPONSORED RESEARCH OR DEVELOPMENT

Not applicable.

BACKGROUND OF THE INVENTION

1. Field of the Invention

The claimed invention relates generally to alternative energy devices, and more specifically relates to a kinetic energy storage device having counter-rotating flywheels, a differential, and a control mechanism that operate as a true infinitely variable transmission.

2. Description of Related Art

Various methods of storing energy are known in the art. For example, some known methods are hydro-electric, solar/thermal, battery, kinetic energy, and fossil fuel. All of these known methods of energy storage and retrieval involve a cycle. The shortest and most efficient cycle is that of kinetic energy. Kinetic energy can be applied to an object and subsequently retrieved with a very high efficiency. A common kinetic energy storage device uses a flywheel where energy is coupled to a rotating mass by directing torque to the axis of the mass and causing it to rotate. The rotating mass will subsequently continue to rotate, losing energy only to shaft and air frictions of the flywheel. Thus, it is possible to retrieve almost all of the stored kinetic energy from the flywheel, minus any frictional losses.

Use of a conventional flywheel in vehicle applications has some associated drawbacks. For example a flywheel imparts a gyroscopic effect to the vehicle, affecting the handling, particularly in cresting a hill or turning the vehicle.

BRIEF SUMMARY OF THE INVENTION

The present invention takes advantage of the efficiency of flywheels and overcomes the shortfalls of conventional vehicle flywheel designs by providing two counter-rotating flywheels coupled to a differential. The common input-output of the differential is coupled, by conventional means such as a drive belt, drive shaft, or the like which in turn can be used to transfer energy to or from a powered device, such as a vehicle drive train. The counter-rotating flywheels are variable inertia, adjustable via a control mechanism to vary the angular velocity of the flywheel with no loss of momentum. This allows variations in their angular velocity resulting in a transfer of momentum to the output of the differential. The combination of the flywheels, differential, and control mechanism acts as a true infinitely variable transmission. The kinetic energy storage device can thus be coupled to, for example, a vehicle drive train and controlled to accelerate or decelerate the vehicle with the loss of kinetic energy of the vehicle subject only to the losses of the drive train friction. As compared to single flywheel device, the counter-rotating flywheels of the present invention provide a more balanced system minimizing the gyroscopic effect imparted to a vehicle by a single flywheel system. And, because the system operates as a true infinitely variable transmission, there is no engagement/disengagement of the differential, allowing a more efficient transfer of power than conventional systems as well as smoother operation.

A kinetic energy storage device in accordance with a first exemplary embodiment of the present invention comprises first and second counter-rotating flywheels arranged on a common axis, each coupled to an epicyclic differential that allows kinetic energy to be transferred to and from the flywheels. A control rod extends though each flywheel and differential, connected at opposite ends to a control mechanism in each flywheel so that movement of the control rod varies the moment of inertia of both flywheels simultaneously. A control motor coupled to the control rod commands output by rotating the control rod. A threaded screw portion of the control rod extends through a mating threaded nut in the differential which rotates to move the control rod when the difference in angular velocities between the flywheels is not zero. The control mechanism thus acts to cause the output of the differential to follow the rotation of the control rod and screw. The control rod is driven by the control motor to command output of kinetic energy from the device.

In a second exemplary embodiment, a kinetic energy storage device comprises first and second counter-rotating flywheels, each coupled to a differential that allows kinetic energy to be transferred to and from the flywheels. A control mechanism comprising a hydraulic motor at each flywheel and a hydraulic actuator commanding each motor is connected to a control mechanism in each flywheel so that movement of the hydraulic motors varies the moment of inertia of the flywheel. A feedback mechanism coupled between the output of the differential and the control mechanisms acts to adjust the moments of inertia of the flywheels when the difference in angular velocities between the flywheels is not zero.

In another exemplary embodiment, a spin-up fixture is provided to allow kinetic energy to be added to the kinetic energy storage device. In yet another exemplary embodiment the kinetic energy storage device is coupled to a vehicle axle assembly.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

DETAILED DESCRIPTION OF EXEMPLARY EMBODIMENTS

Figure 1:
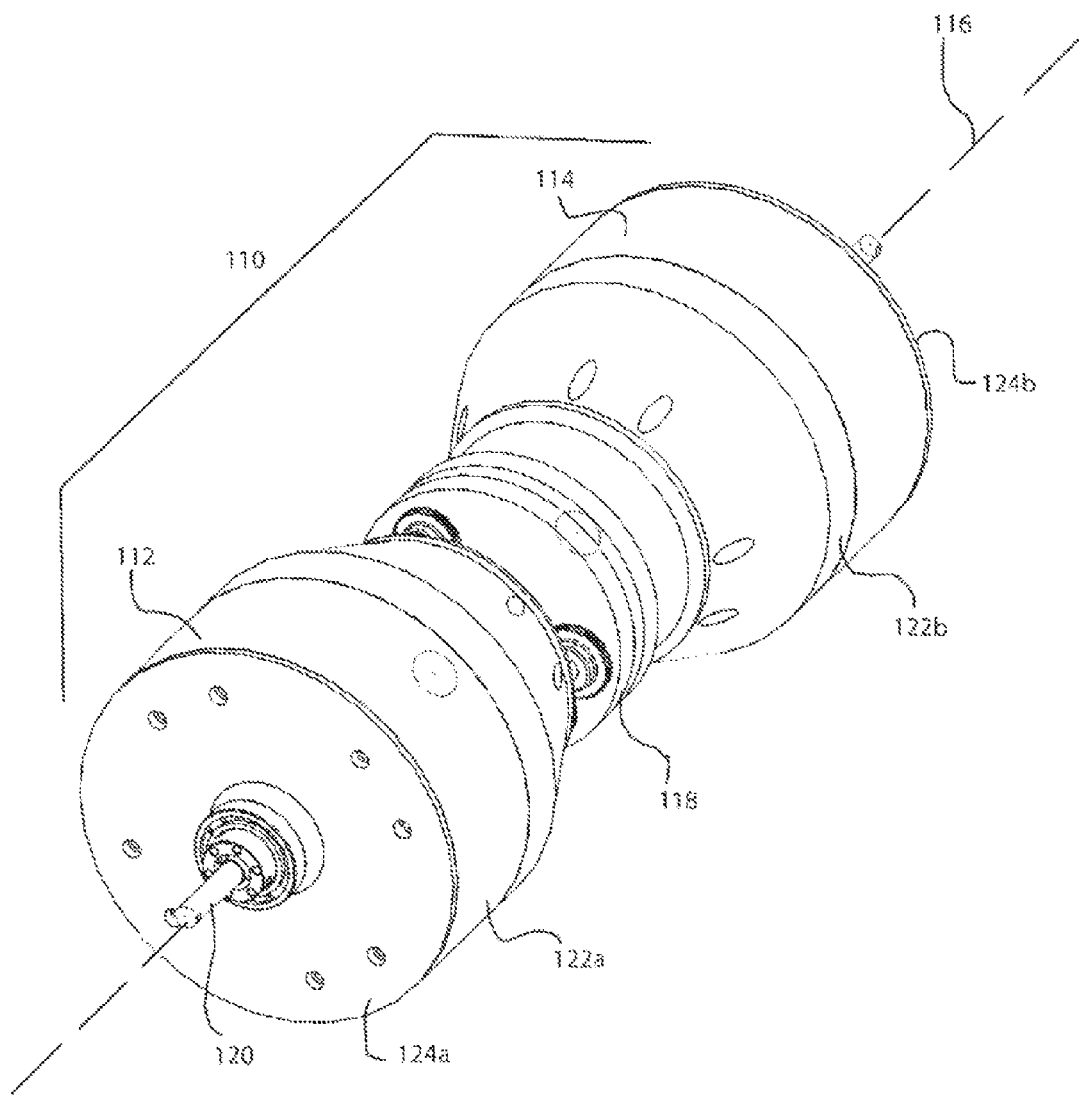
FIG. 1 is a perspective view of a kinetic energy storage device having first and second counter-rotating flywheels coupled to a differential in accordance with a first exemplary embodiment of the present invention.

Looking first to FIG. 1, a kinetic energy storage device in accordance with an exemplary embodiment of the present invention is depicted generally as 110. The kinetic energy storage device comprises first and second variable inertia flywheels 112, 114 arranged concentrically along a common axis 116, with a differential 118 positioned there between. The flywheels are configured to rotate in opposite directions (i.e., counter-rotating flywheels) and are each coupled to epicyclic differential 118 which allow the transfer of kinetic energy to or from the flywheels. A control mechanism for varying the inertia of the flywheels comprises a control rod 120 that extends along axis 116, through each of the flywheels and through differential 118. As will be explained in more detail below, control rod 120 is coupled to a control hub in each flywheel to allow adjustment of the moment of inertia of each flywheel in response to a transfer of kinetic energy.

As also seen in FIG. 1, each flywheel includes a housing 122a, 122b and a cover 124a, 124b to enclose and protect the fly-weights and other components of the flywheel. Housings 122a, 122b and covers 124a, 124b further serve to contain the components of the flywheels in the event of breakage or damage.

Figure 2:
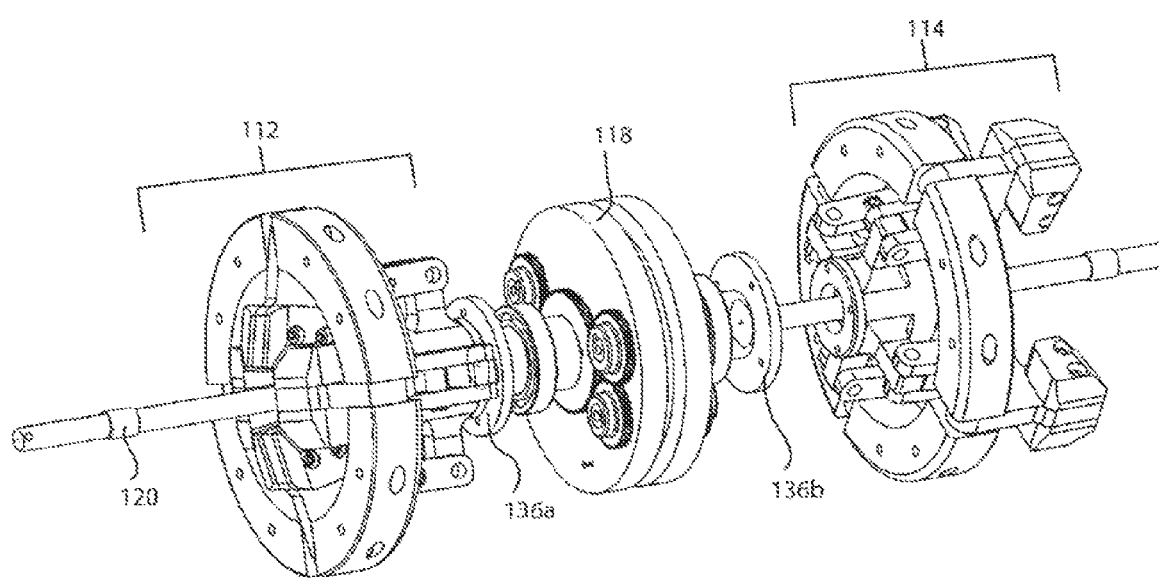
FIG. 2 is a partial side perspective view of the kinetic energy storage device of FIG. 1 showing the internal components of the flywheels.
Figure 3:
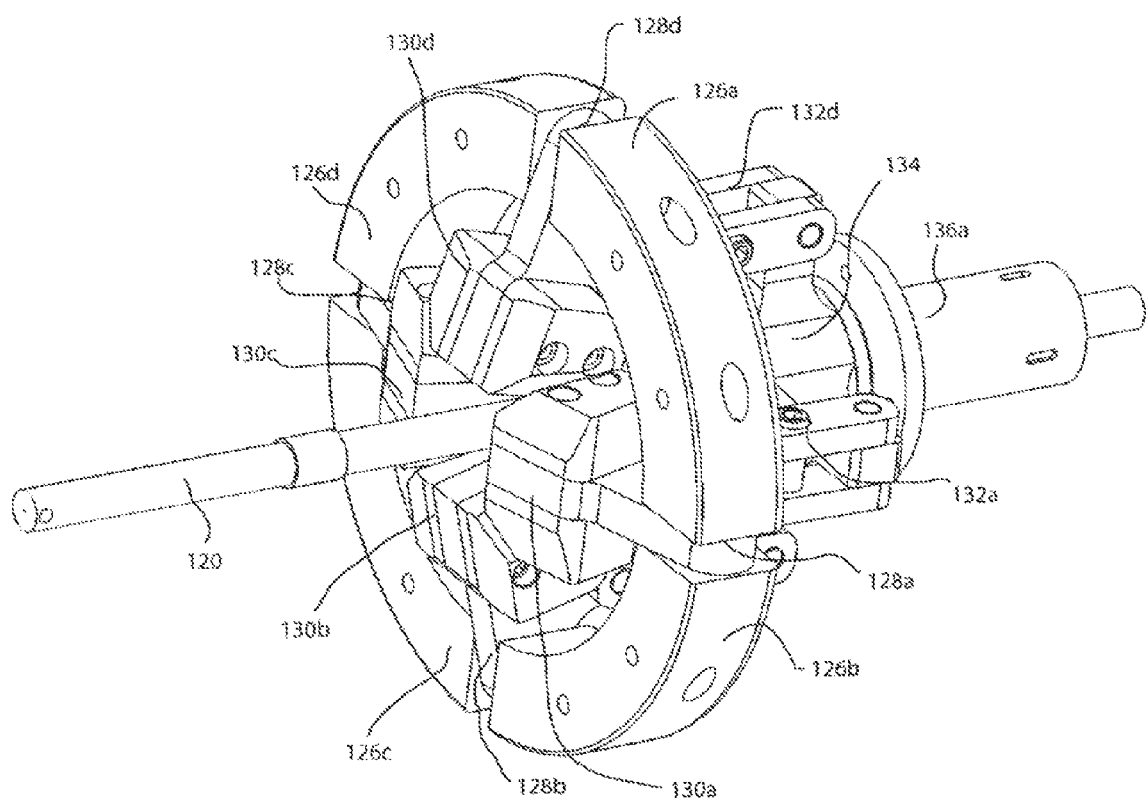
FIG. 3 is a close-up perspective view of the second flywheel of the device of FIG. 2 with the fly-weights in a retracted position.
Figure 4:
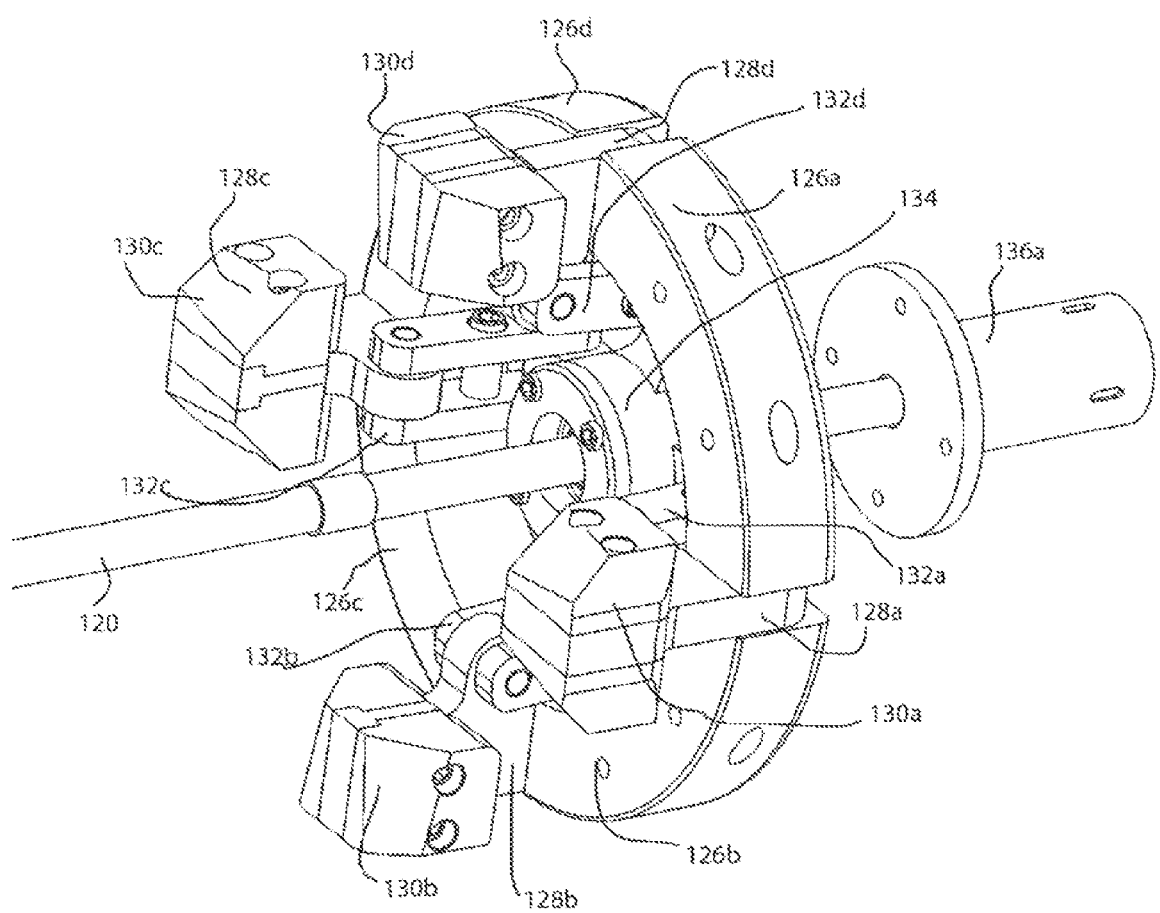
FIG. 4 is a close-up perspective view of the second flywheel of the device of FIG. 2 with the fly-weights in an extended position.

With reference to FIGS. 2, 3, and 4, each flywheel 112, 114 comprises four spindle blocks 126a, 126b, 126c, 126d arranged around axis 116 in a concentric, sectioned cylindrical configuration, with spaces between adjacent blocks. Elongated flyweight stems 128a, 128b, 128c, 128d are pivotally attached in the spaces between each adjacent pair of spindle blocks via a pin extending through an aperture in the stem and into corresponding apertures in the spindle blocks. Thus, the distal ends of stems 128a, 128b, 128c, 128d pivot about the pin in the spaces both inwardly (towards the axis) and outwardly (away from the axis). Flyweights 130a, 130b, 130c, 130d are attached at the distal end of each corresponding stem. A control linkage 132a, 132b, 132c, 132d extends between each corresponding stem and a common control hub 134, with opposite ends of the linkage pivotally attached to the stem and hub, respectively.

As best seen in FIGS. 3 and 4, control hub 134 is attached to control rod 120 so that moving the control rod linearly (i.e., along axis 116) likewise moves the hub along axis 116. With the control linkages 132a, 132b, 132c, 132d, stems 128a, 128b, 128c, 128d and flyweights 130a, 130b, 130c, 130d attached and configured as described previously, it can be seen that control rod 126 is used to move control hub 134 so as to retract and extend the flyweights towards and away from the axis. As seen in FIG. 3, with the control hub 134 moved or pushed away from the spindle blocks 126a, 126b, 126c, 126d, the flyweights 130a, 130b, 130c, 130d are retracted toward the axis. Similarly, with the control hub 134 pulled toward the spindle blocks, the flyweights are extended away from the axis. Thus, the moment of inertia of the flywheel is adjusted using control rod 126 to control the position the flyweights. As also shown in FIGS. 2-4, each flywheel 112, 114 includes a flywheel hub 136a, 136b, coupling the flywheel to the differential, with the differential sandwiched between the flywheel hubs. Flywheel hubs 136a, 136b preferably include apertures for receiving fasteners to releasably attach the hubs to the flywheels.

It should be understood that the exemplary embodiment described is illustrative, and not limiting, and that variations of the configuration shown and described are within the scope of the present invention. For example, while the flywheel is shown with four sections (four spindle blocks, four stems, four control linkages, and four flyweights), other configurations, such as three or five sections could be used. Similarly, the positioning and lever ratio of the control linkage and stems could be varied to provide greater or lesser movement of the flyweights in response to a given movement of the control hub. These and other variations will be apparent to those skilled in the art, and are within the scope of the present invention.

Figure 5:
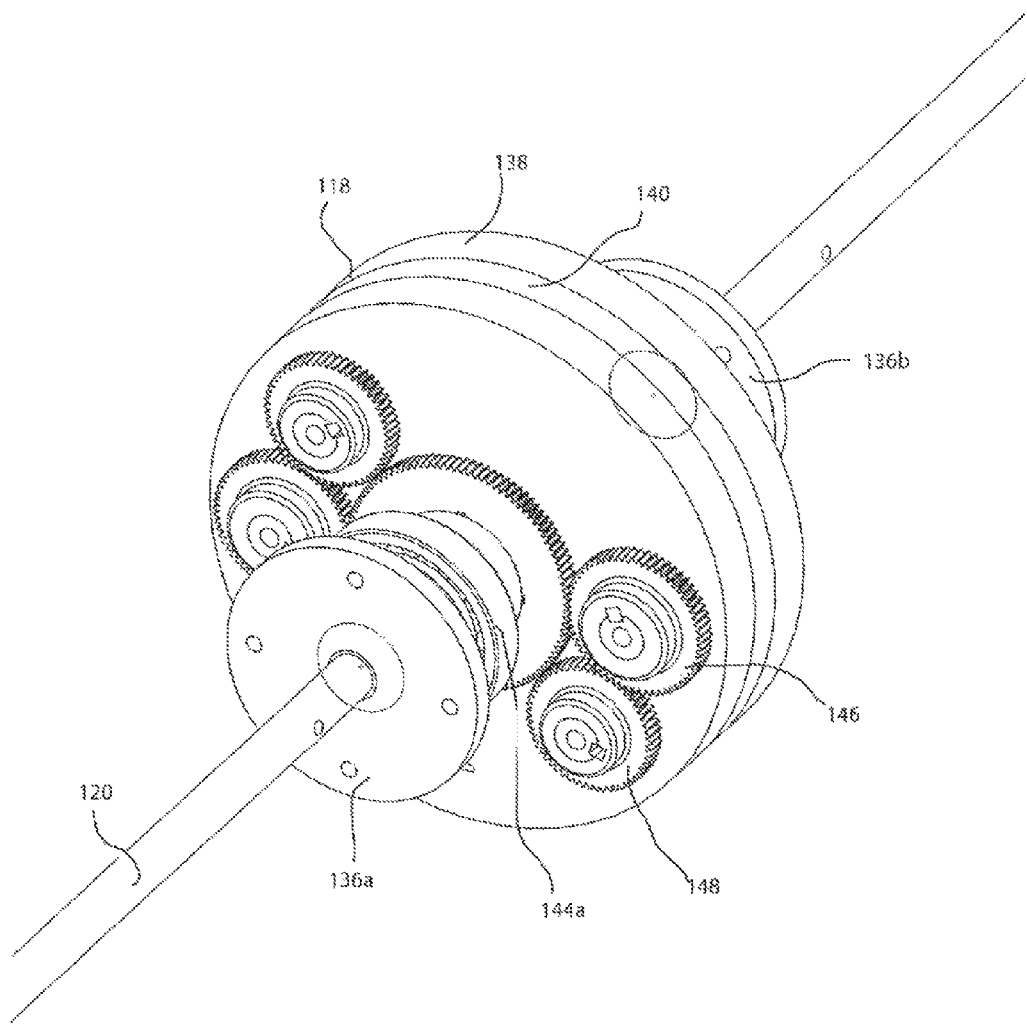
FIG. 5 is a close-up perspective view of the differential of the kinetic energy storage device of FIG. 1.
Figure 6:
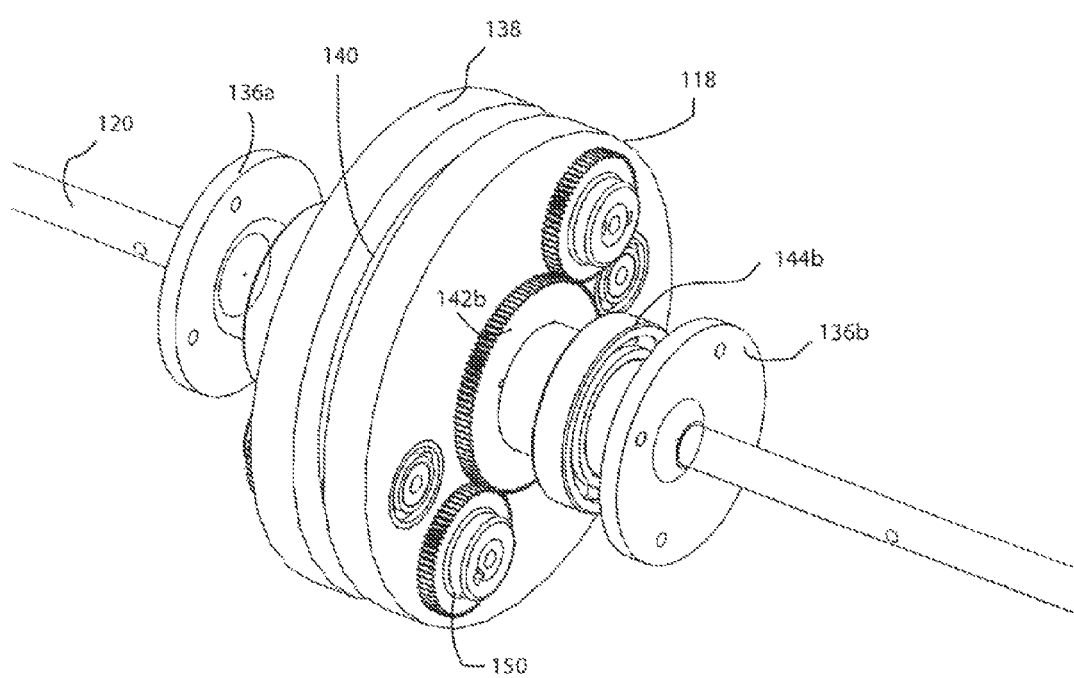
FIG. 6 is a perspective view of the opposite end of the differential of FIG. 5.

Looking to FIGS. 5 and 6, epicyclic differential 118 comprises a generally cylindrical, planetary body 138 having an integral drive belt pulley 140 configured to receive a drive belt to transfer kinetic energy to and from the differential. First and second input/output gears 142a, 142b are affixed to opposite sides of the differential and attach to the respective flywheel hubs 136a, 136b through ball bearing couplers 144a, 144b. Flywheel hubs 136a, 136b thus couple each of the flywheels 112, 114 to the differential so that kinetic energy from the flywheels is transferred to the differential, and conversely, so that kinetic energy from the differential is transferred to the flywheels through the input/output gear/flywheel hub arrangement.

As seen best in FIG. 5, the first side of differential 118 (i.e., the side of the differential positioned adjacent to first flywheel 112) includes a first planetary gear 146 positioned to mesh with and engage first input/output gear 142a so that turning either of the gears causes the other to likewise turn. Planetary gear 146 is further positioned to mesh with and engage reversing gear 148 which drives a shaft extending through the differential to another planetary gear 150 (shown in FIG. 6) located on the opposite side of the differential, that planetary gear 150 in engagement with second input/output gear 142b. It should be understood that reversing gear 148 is not engaged with first input/output gear 142, but only with planetary gear 146, and thus serves only to transfer and reverse rotation from one side of the differential to the other. As seen in FIGS. 5 and 6, an identical second planetary gear/reversing gear arrangement is positioned on the opposite side of (approximately one-hundred eighty degrees around) the input/output gears.

With the differential configured as just described, it can be seen that rotation of first input/output 142a turns planetary gear 146 and reversing gear 148. That rotation is carried to planetary gear 150 on the opposite side of the differential and to second input/output gear 142b. Thus, flywheel rotation on one side of the differential is transferred to rotation in the opposite direction on the other side of the differential. Preferably, the gear ratio between the first and second sides of the differential is approximately 1:1, although variations from that ratio are accommodated by the present invention. Further, other configurations and arrangements of the gearing may be employed without deviating from the present invention. Additionally, while the exemplary embodiment described is an epicyclic differential, it should be understood that other types of differentials may be used and are anticipated by the present invention.

Figure 7:
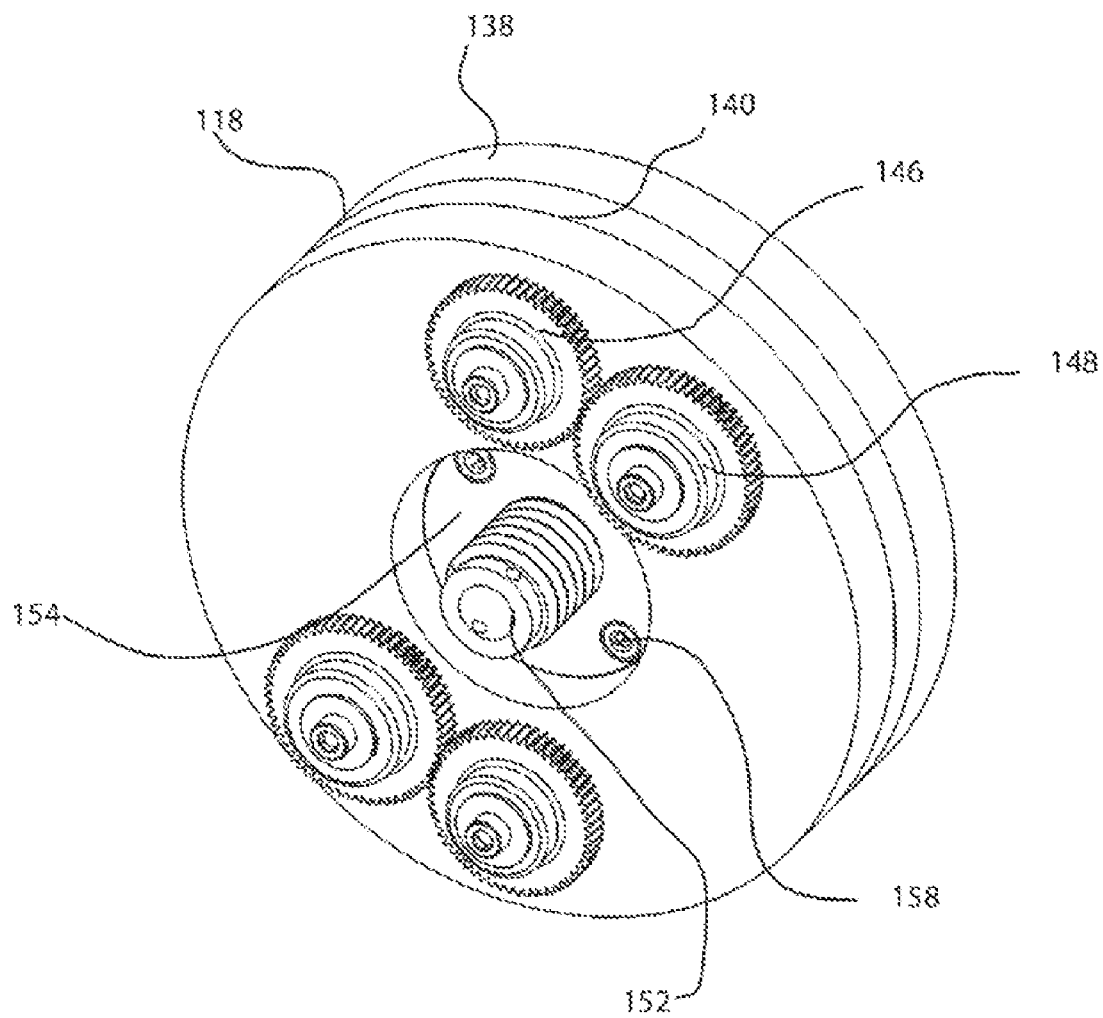
FIG. 7 is a partial view of the differential of FIG. 5, showing the control screw portion of the control mechanism.
Figure 8:
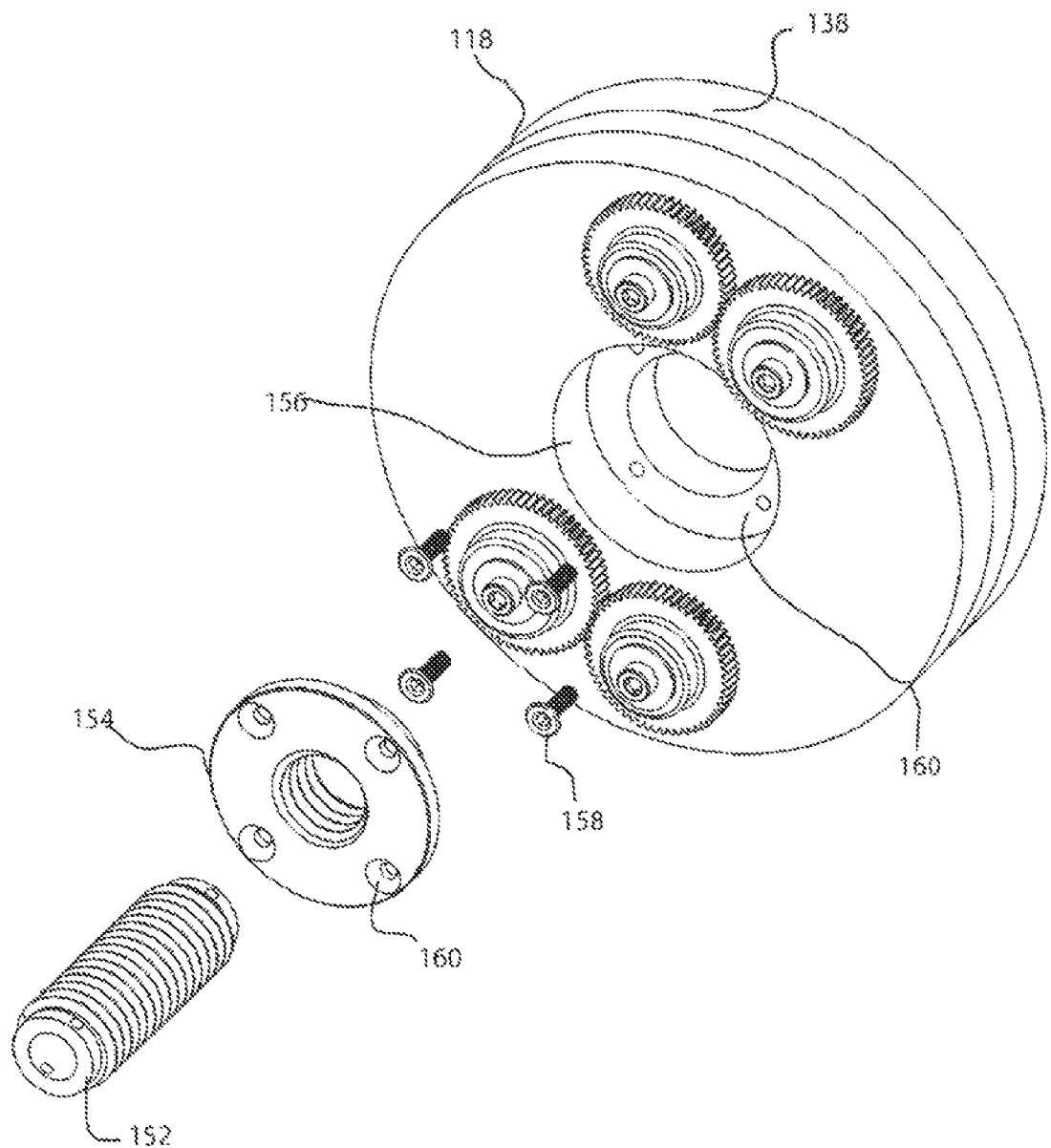
FIG. 8 is an exploded view of the differential of FIG. 7.

Looking to FIGS. 7 and 8, the innermost portion of differential 118 houses a threaded control screw 152 engaged within a similarly-threaded control nut 154. Control nut 154 attaches within a cylindrical receptacle 156 concentric to the center axis of the differential, with fasteners 158 attaching the nut to the differential hub 160. With the control screw 152 and nut 154 affixed to the differential 118 as shown in FIG. 7, it can be seen that rotation of the planetary body 138 of the differential rotates the affixed control nut 154 which drives control screw 152. Thus, control screw 152 is moved inwardly or outwardly along the axis of the differential, depending on the direction of rotation of the planetary body. Opposite ends of control screw 152 are configured to couple to control rod 120 (as described above) so that control screw 152 is in-line with control rod 120. Alternatively, control screw 152 could be formed integrally with control rod 120.

With reference to FIGS. 1-8, in operation, flywheels 112, 114 are initially spun-up using a spin-up fixture (described in more detail below) so that each flywheel has an initial stored kinetic energy. A control motor (not shown) is coupled to control rod 120 to provide commands to the control mechanism by rotating control rod 120. Control rod 120 is in turn coupled to the control hub 134 of each flywheel, with control screw 152 in-line with the control rod. With the moments of inertia of both flywheels equal, their angular velocity is equal. Thus, the angular velocity of the planetary body 138 of the differential 118 (i.e., the output of the device) is zero. Any difference in the angular velocities of the flywheels results in an angular rotation of the planetary body, which in turn causes a rotation of the control nut 154 attached to the center of the differential. Rotation of the control nut drives control screw 152 which moves control rod 120 along its axis, which in turn moves the control hubs 134 of each flywheel to adjust the moment of inertia of the flywheel until they are equal and the difference in angular velocities drops to zero. Thus, the control screw/control rod/control hub mechanism acts as a feedback loop between the two flywheels to maintain the proper moments of inertia such that the differential output follows the rotation of the control rod and screw, as commanded by the control motor driving the control rod. It should be understood that the control/feedback mechanism also acts to account for any inaccuracies or mismatches in the device. For example, while the gear ratio of the planetary and reversing gears of the differential is preferably 1:1, a slight variance in that ratio will be automatically adjusted for by the control mechanism when that variance causes a slight difference in angular velocities. Thus, the kinetic energy storage device of the present invention provides a robust adaptable system.

It should be further understood that while the control and feedback mechanism acts to maintain the difference in angular velocities of the flywheels at zero when no command is present (i.e., no demand for kinetic energy from the flywheels and no kinetic energy input to the flywheels), it also operates to command a difference in angular velocities when kinetic energy is desired to be extracted from the flywheels to the differential (e.g., to drive a vehicle axle) or when kinetic energy is transferred into the flywheels (e.g., from a vehicle axle).

Spin-Up Fixture

Figure 9:
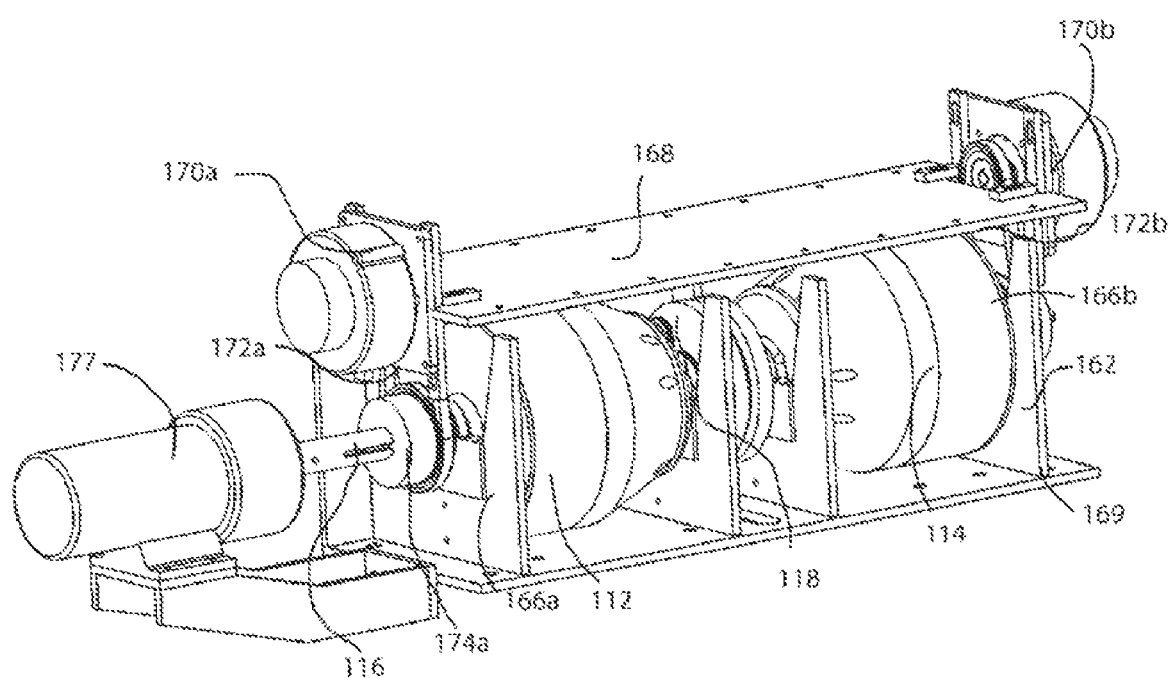
FIG. 9 is a perspective view of the kinetic energy storage device of FIG. 1 mounted in a spin-up fixture.

Looking to FIG. 9, a spin-up fixture for providing initial kinetic energy to the kinetic energy storage device of the present invention is shown as 162. Fixture 162 includes a base 164 connected to vertically extending walls 166a, 166b connected by a top platform. Electric motors 170a, 170b are attached to the fixture and connect via drive belts 172a, 172b to a clutch mechanism 174a coupled to each flywheel 112, 114 of the device. Each electric motor 170a, 170b is used to spin up the respective flywheel 112, 114 with an initial kinetic energy. As described above, the control and feedback mechanism is operable to equalize the angular velocities of the flywheels and to command the output or input of the differential. Preferably, the kinetic energy storage device is spun-up immediately prior to installation in its intended use, such as a vehicle.

Vehicle Use

Figure 10:
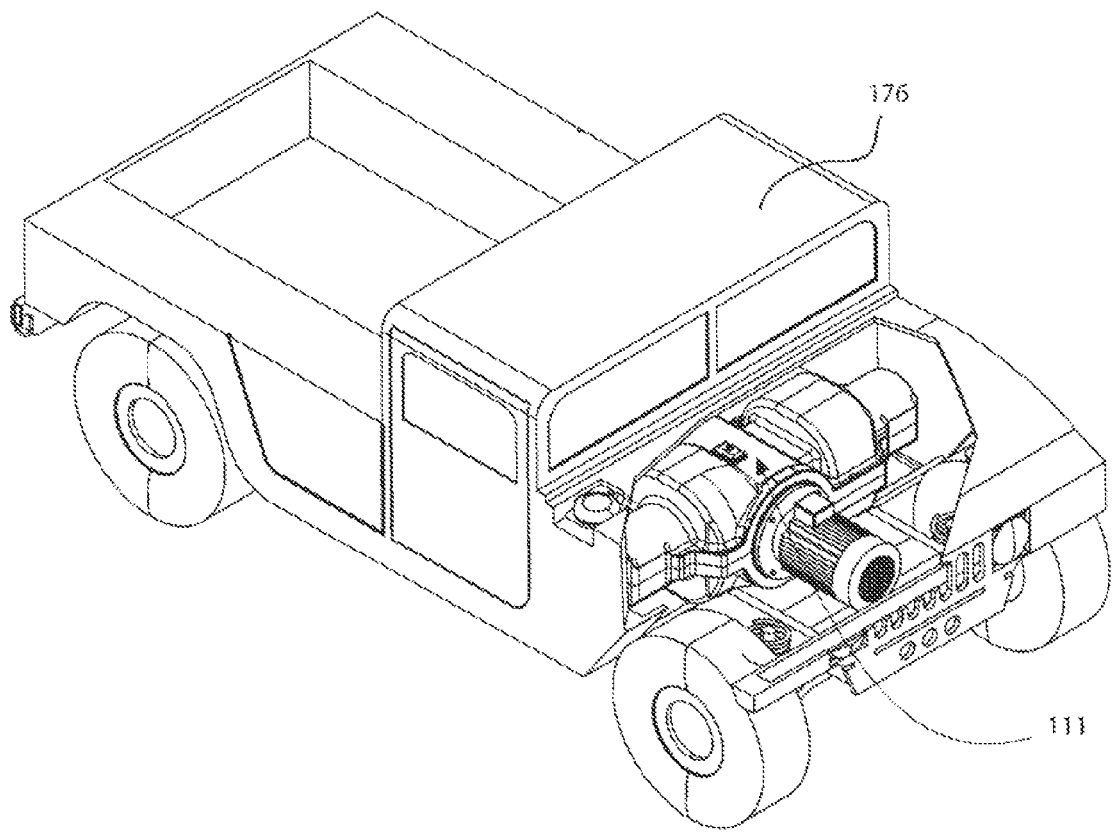
FIG. 10 is a perspective view of the kinetic energy storage device of FIG. 1 contained in a housing and mounted in a vehicle.

FIG. 10 depicts a kinetic energy storage device in accordance with an exemplary embodiment of the present invention encased in an enclosure 111, in use with a vehicle 192. Preferably, a drive shaft or drive belt extends between the planetary body of the differential of the device to a similar pulley on the axle assembly of the vehicle. Alternatively, the kinetic energy storage device may be connected to the vehicle through a transmission or vehicle differential. These and other alternatives will be apparent to those skilled in the art and are within the scope of the present invention.

Second Exemplary Embodiment

A kinetic storage device in accordance with a second exemplary embodiment of the present invention is depicted in FIG. 11-21.

Figure 11:
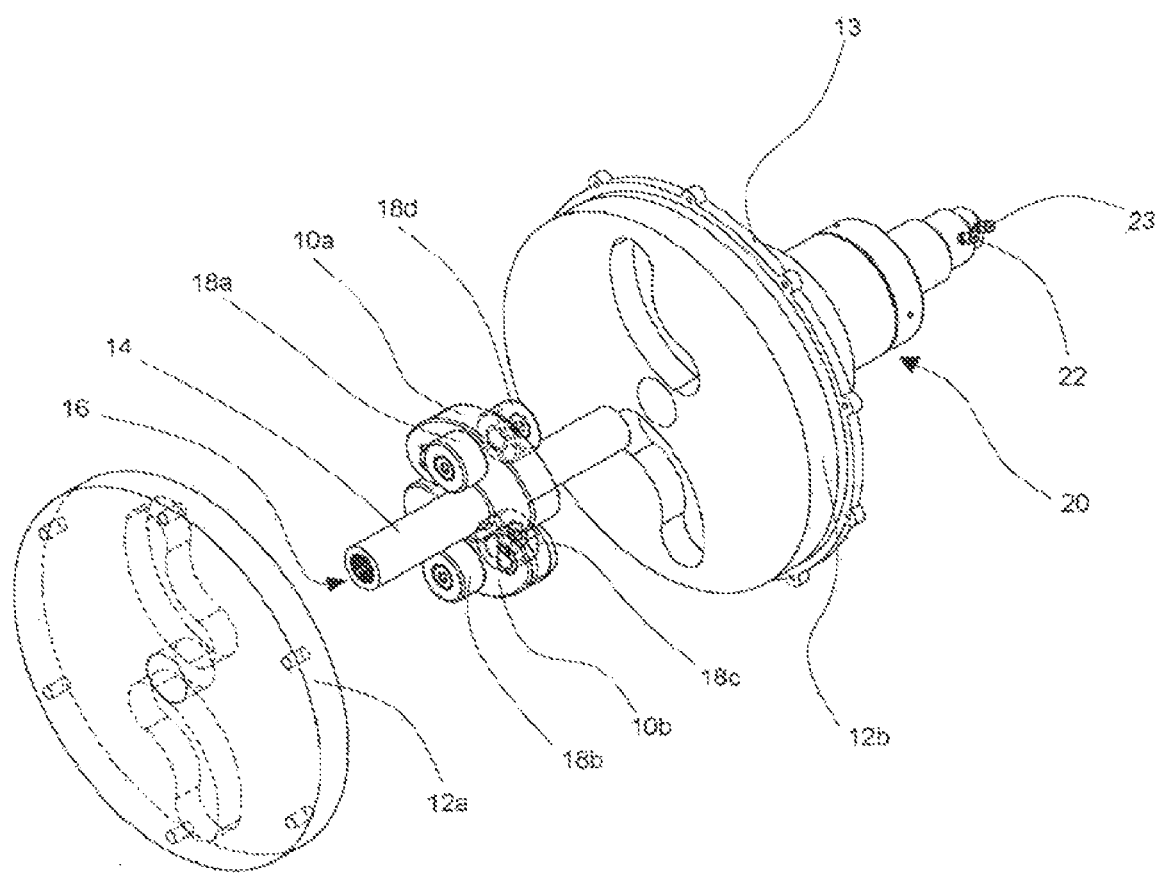
FIG. 11 is a perspective view of a portion of a kinetic energy storage device in accordance with a second exemplary embodiment of the present invention showing the movable mass portion in a retracted position.
Figure 12:
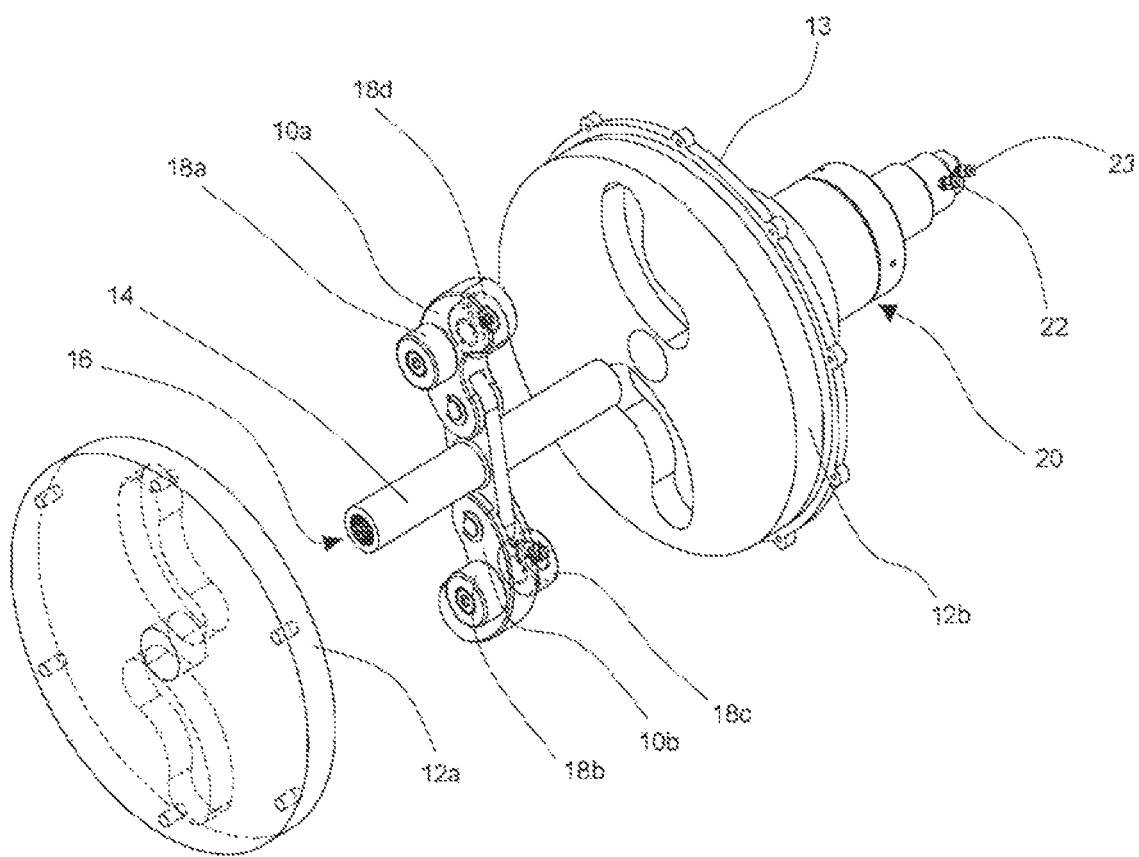
FIG. 12 is a perspective view of the device of FIG. 12 showing the movable mass portion in an extended position.
Figure 13:
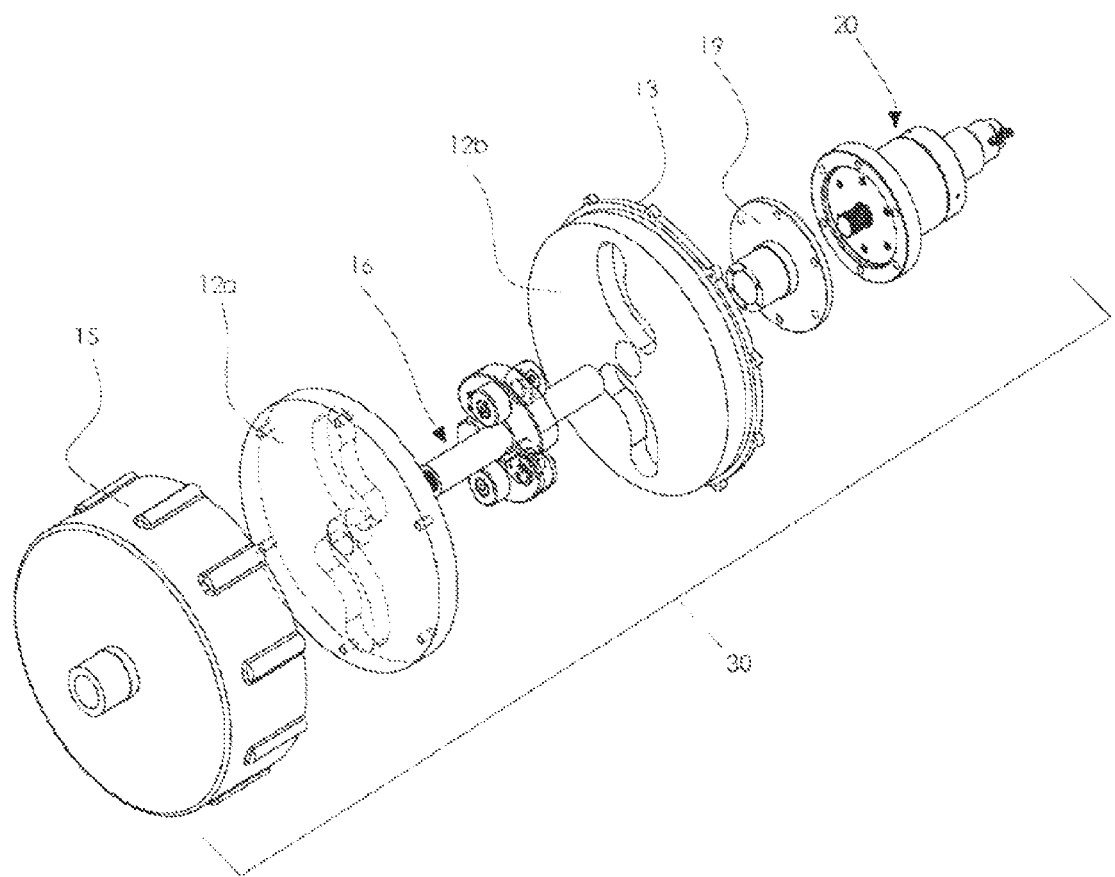
FIG. 13 is a perspective view of the kinetic energy storage device of FIG. 11 further including a case.
Figure 14:
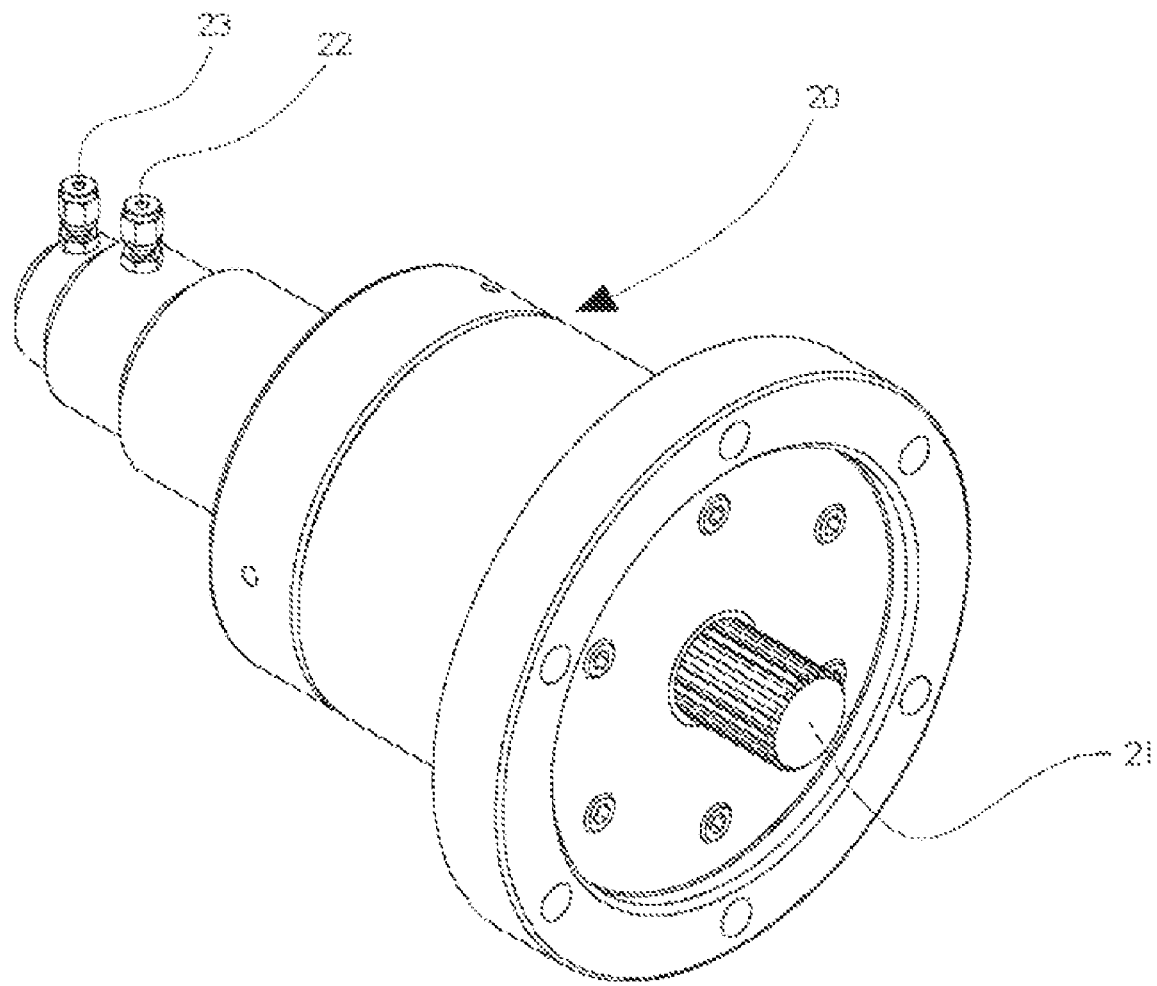
FIG. 14 is a perspective view of the hydraulic rotary actuator portion of the control mechanism of the device of FIG. 11.
Figure 15:
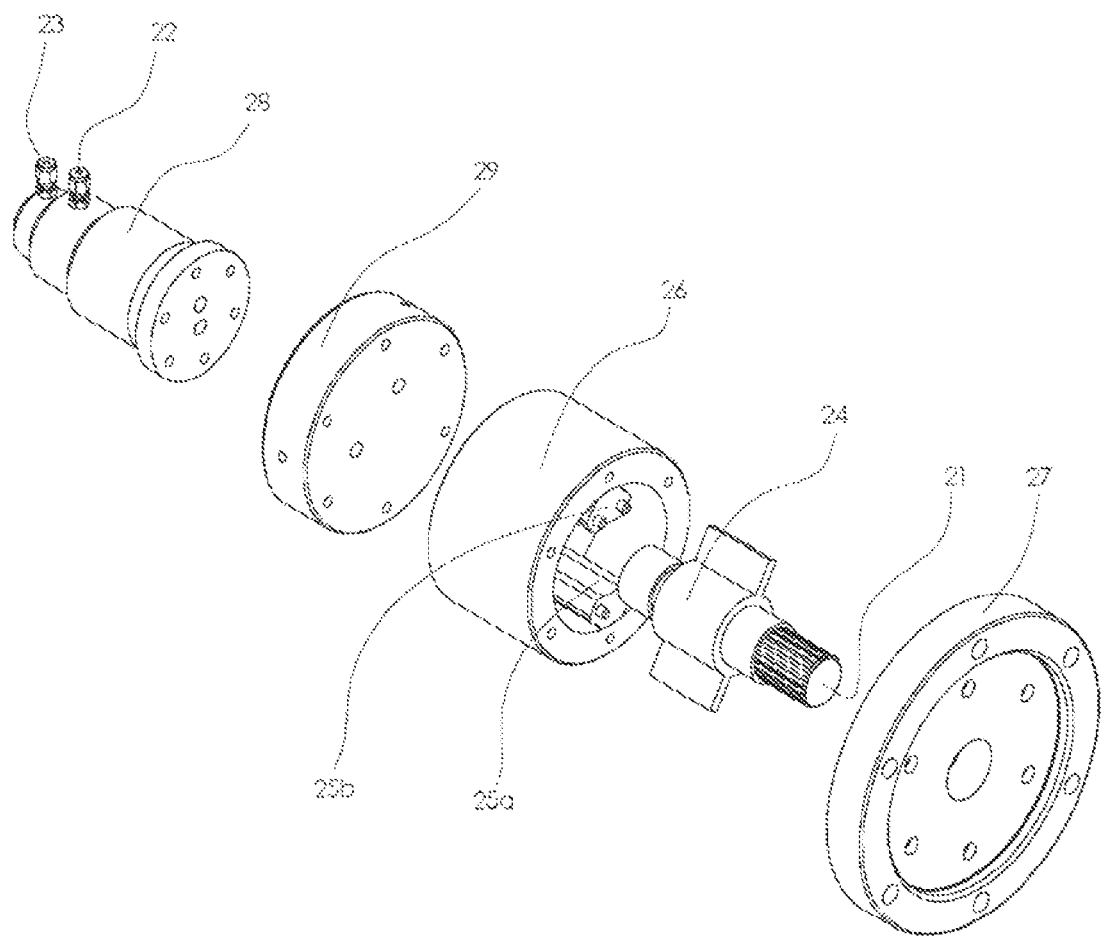
FIG. 15 is an exploded view of the rotary actuator of FIG. 14
Figure 16:
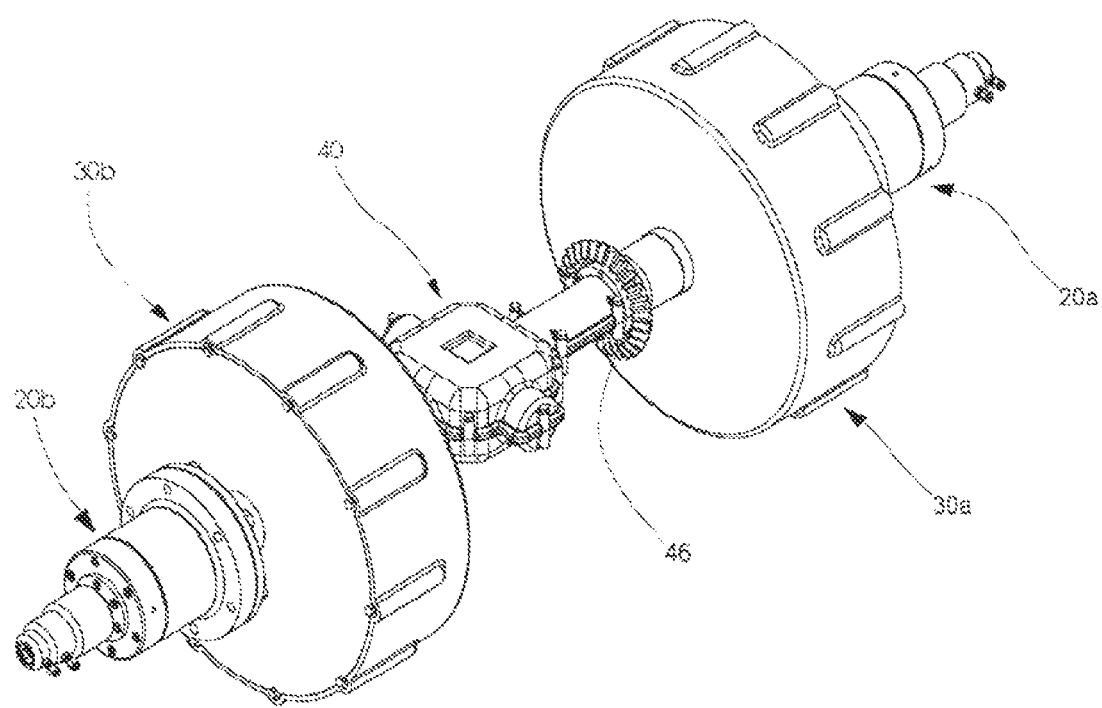
FIG. 16 is a perspective view of a portion of a kinetic energy storage device having dual flywheels coupled to a differential in accordance with a second exemplary embodiment of the present invention.
Figure 17:
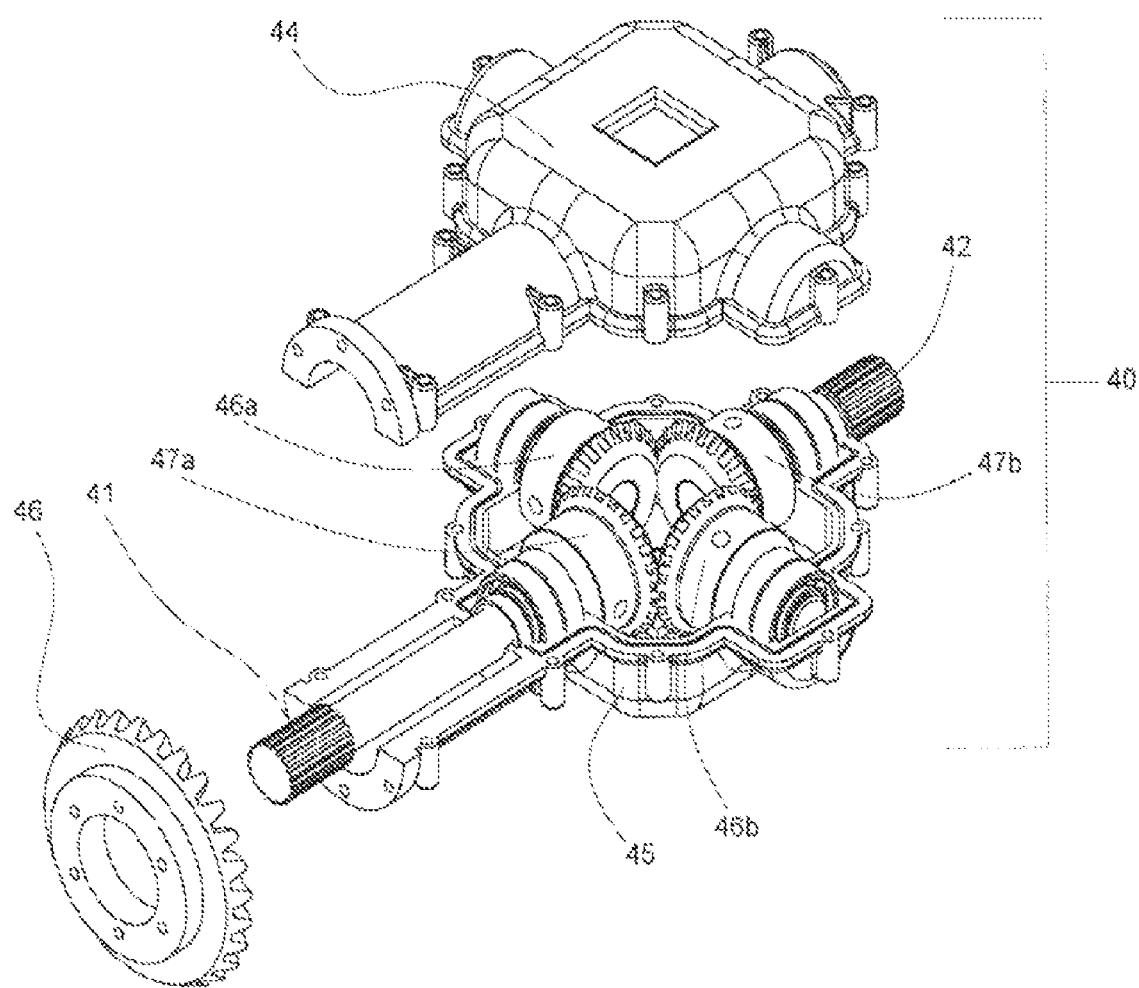
FIG. 17 is an exploded view of the differential of the device of FIG. 16
Figure 18:
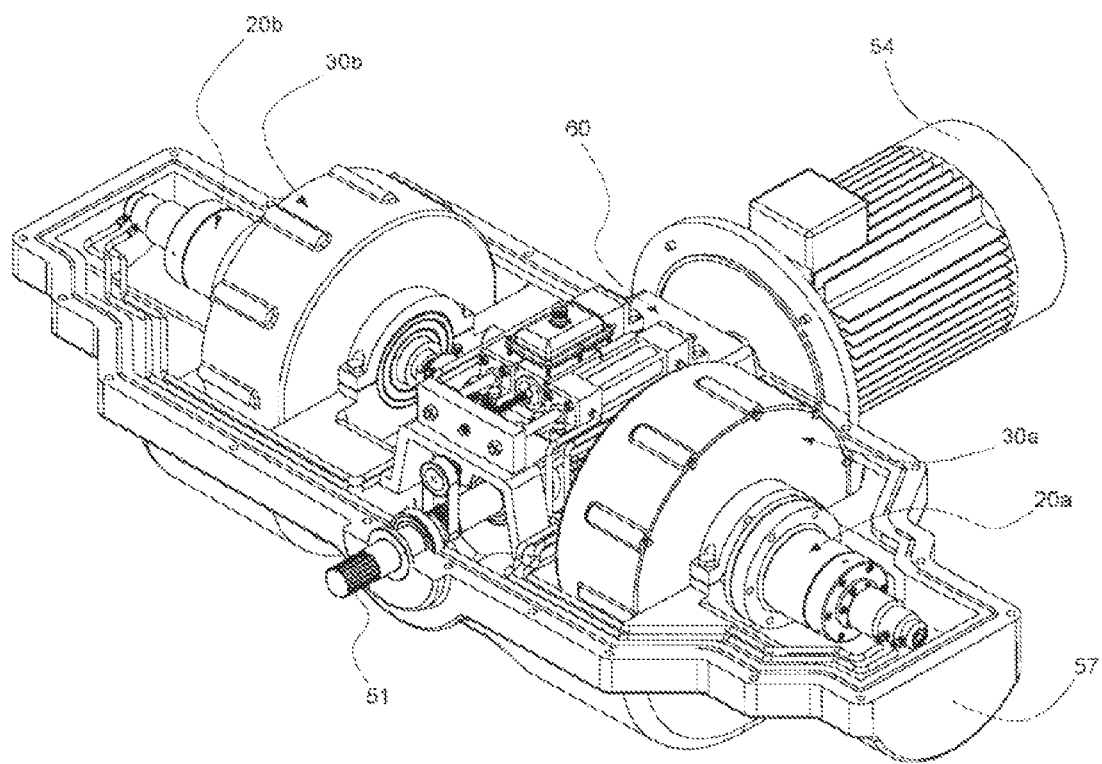
FIG. 18 is a perspective view of a kinetic energy storage device in accordance with a second exemplary embodiment of the present invention.
Figure 19:
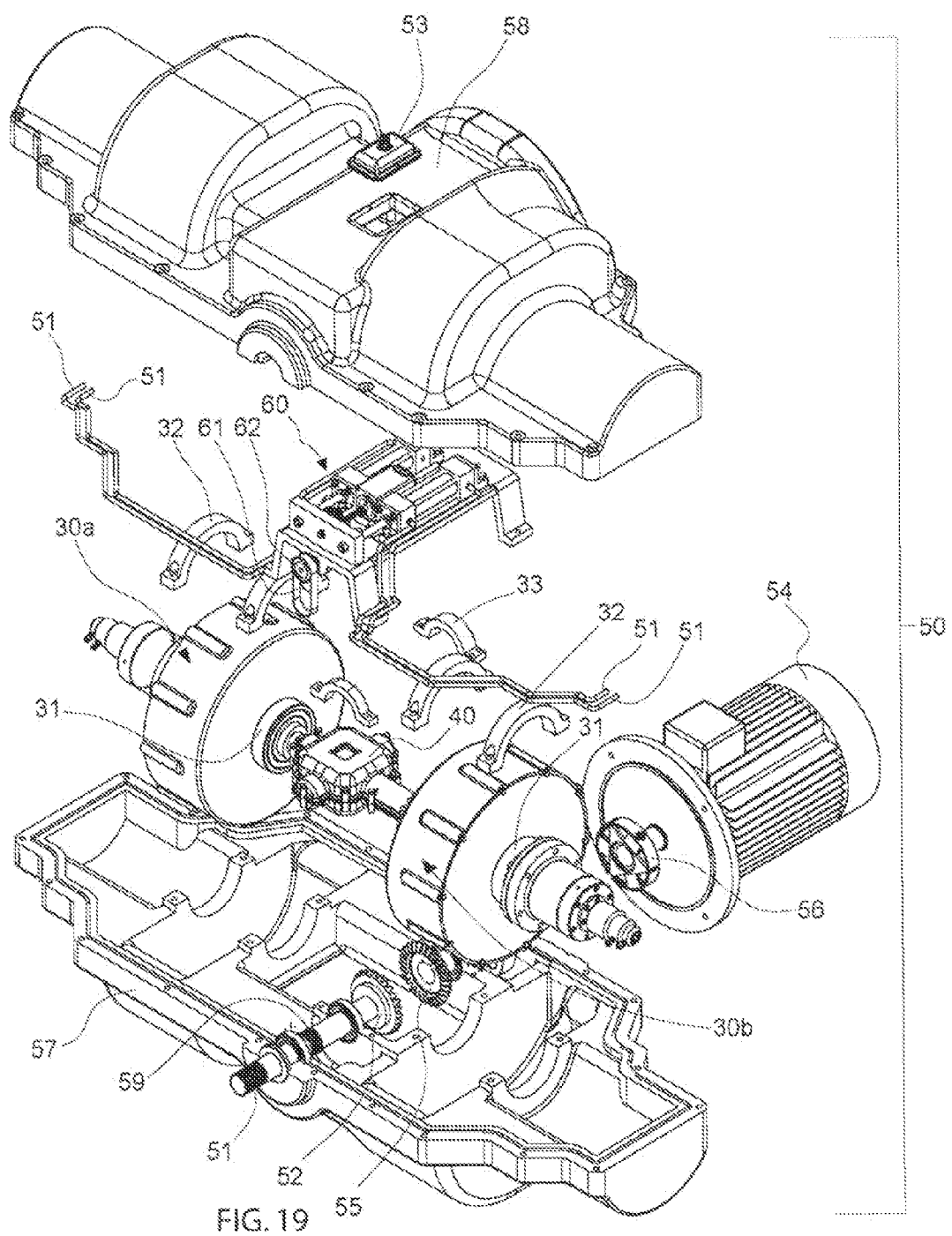
FIG. 19 is an exploded view of the device of FIG. 18 showing the flywheel/differential assembly, a control mechanism, an electric drive motor, and a sealed vacuum enclosure.
Figure 20:
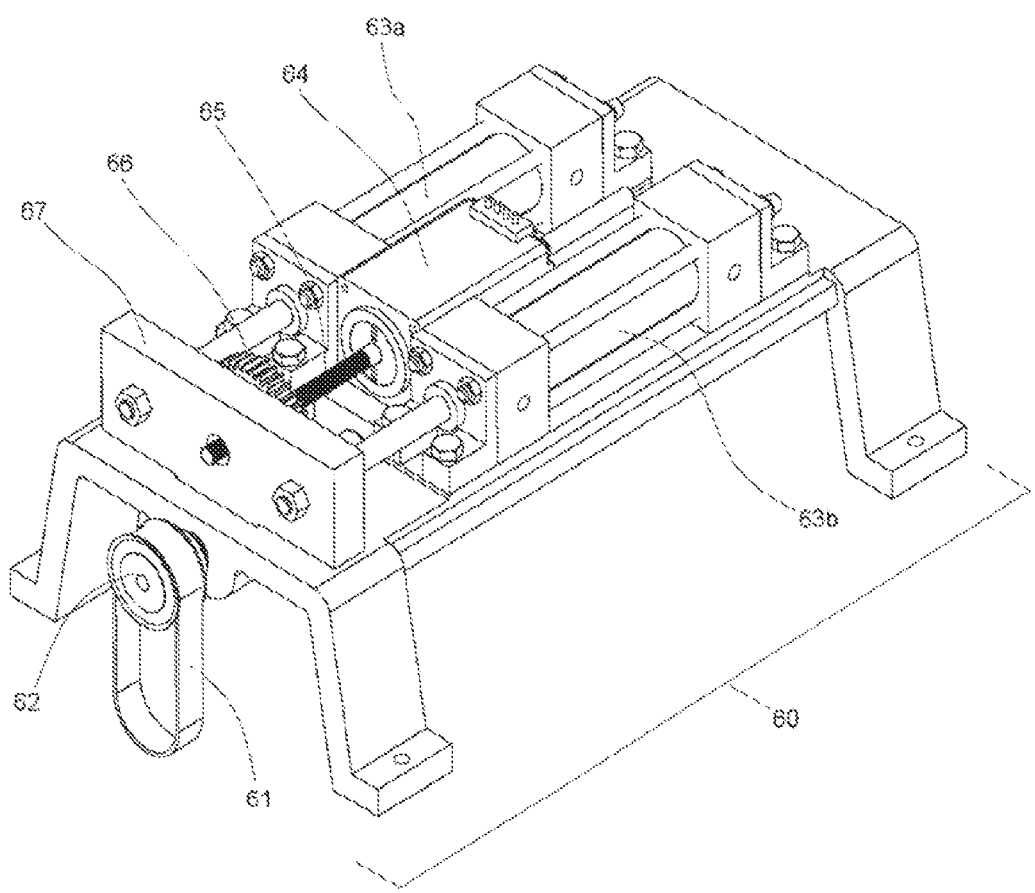
FIG. 20 is a top perspective view of a variable-inertia adjusting assembly for use with the device of FIG. 18.
Figure 21:
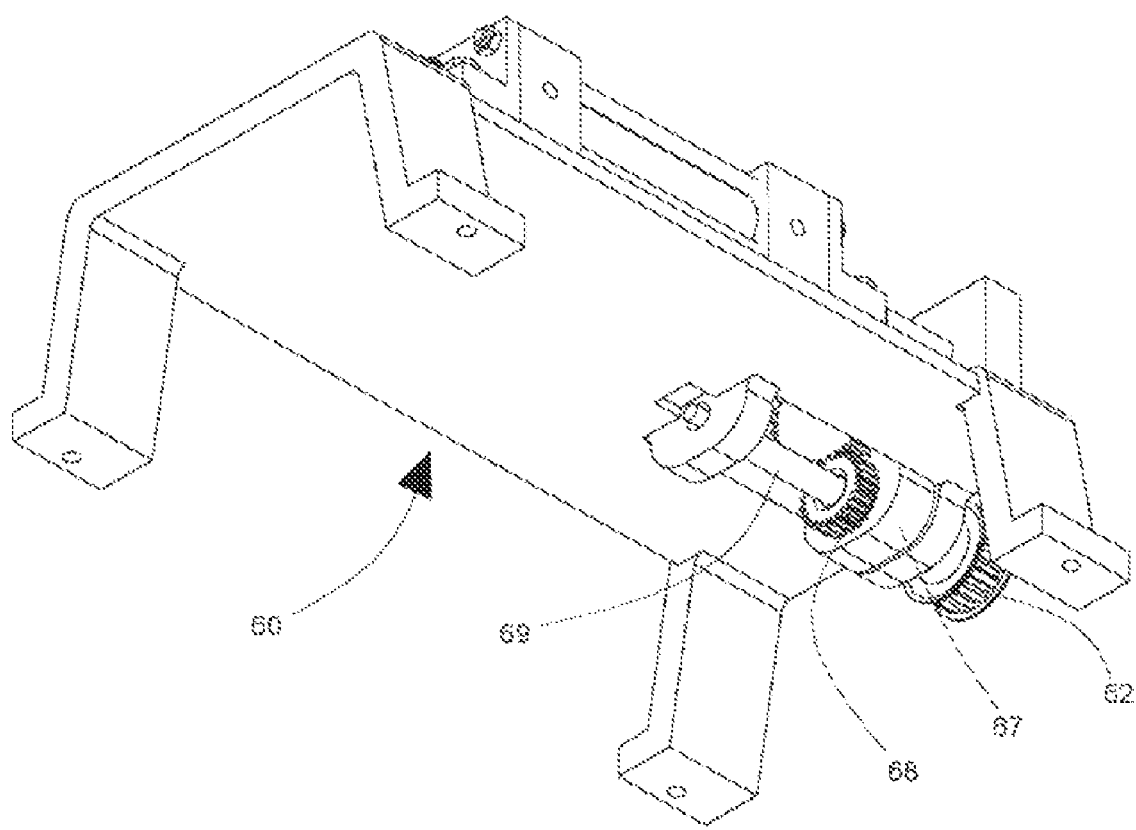
FIG. 21 is a bottom perspective view of the adjusting assembly of FIG. 20.

Looking first to FIGS. 11 and 12, a flywheel assembly includes two masses 10a, b, each hinged to a rotating arm 11. Arm 11 is attached to a shaft 14 having internal splines 16 at opposite ends of the shaft. Masses 10a, 10b are attached to bearing pairs 18a, b and 18c, d at approximately the midpoint of their length. The bearings function as cam followers, riding in grooves 8a, b, in plates 12 a, b. The grooves are shaped to cause the mass to rotate about the hinged-axis of bar 11. When bar 11 is caused to rotate in relation to plates 12a, b, the masses are forced to rotate about the hinges-axis of bar 11. The center-of mass (COM) of each of the two masses follow a path from a position extremely close to the axis of rotation of the flywheel assembly to a position extremely away from the axis of rotation, thereby varying the inertia of the flywheel assembly 17 according to the equation I=Iq+(2*(Im+(M*k2))), where I is the inertia of the flywheel assembly 17, Iq is the inertia of the non-adjustable rotating components 12, 13, 14, 15, Im is the inertia of each moveable mass 10a, b, M is the mass of the moveable masses 10a, b, and k is the distance of the center-of-mass of each mass to the axis of rotation of the flywheel assembly.

Each pivoting mass 10a, b includes two cam-follower bearings 18a, b for mass 10a and 18c, d for mass 10b. The cam follower bearings follow a track 8a, b in cam plates 12a, b. The cam plates are held rigidly together by being fixed to drum 15 and back plate 13. Shaft 14 with bar 11 is rotatable about the axis of rotation of the flywheel assembly 30a, b and may be angularly displaced relative to drum 15 and cam plates 12a, b. This displacement, or phase shift, causes each of the pivotable masses 10a, 10b to rotate about the hinged pivot point on bar 11, thereby changing their center-of-mass radii and varying their moment of inertia. This phase shift and consequential inertia shift is affected by a hydraulic rotary actuator 20. The body of rotary actuator 20 is rigidly attached to the drum/plate 15, 13, 12a, 12b. The output shaft 21 of the rotary actuator mates with the internal spline 16 of shaft 14. Output shaft 21 is driven by an internal vane 24 contained in a sealed housing 26 with walls 25a, b. When hydraulic fluid is introduced to the chambers created by these walls form the rotary union 28, the vane and shaft are caused to rotate relative to the housing 26, thus driving the pivoting masses 10a, 10b to a new position. The entire assemblies 30a, b are affixed on radial ball bearings 31 with bearing clamps 32 to the lower half of the vacuum housing 57. The hydraulic rotary union 28 is held fixed rotationally allowing the connection of two hydraulic lines 51 to ports 22, 23. These lines are subsequently connected to a hydraulic control unit 60 that will operate according to external electrical commands and cause an adjustment in the relative positions of the masses of both the flywheel assemblies.

Each flywheel assembly 30a, b is connected via the internal spines 16 of shaft 14 to input/output splines 41, 42 of the differential 40. A bevel gear 46 is rigidly attached to the differential housing 44 which is free to rotate. Rotational torque is applied to the flywheel pairs by applying torque to the bevel gear 46. Also, torque from the flywheel pairs is applied to an external load via bevel gear 46. In the exemplary embodiment depicted, an electric drive motor 54 is mounted to the vacuum housing 57, 58. The output shaft for the motor is coupled via a centrifugal clutch 56 to an input bevel gear 55 which is mesh engagement with the input/output bevel gear 46 of the differential 40. Thus, the electric motor can drive the flywheel assemblies and also apply torque to the output shaft 59.

The control head 60 is a slave-follower mechanism that incorporates mechanical feedback, thus providing a closed-loop output speed control. Feedback from the kinetic energy storage device is taken from its output shaft 59 via belt 61 which rotates a laterally restrained nut 68, thereby acting to move the control screw 69. The control motor 64 drives a positioning screw 65 which is mechanically coupled to two hydraulic cylinders 63a, b, each one connected via hydraulic lines 51 to the rotary actuators 20a, b associated with each flywheel assembly. The connections to each flywheel assembly are crossed in a manner that causes the corresponding movement of each pair of masses to be opposite. Therefore, as the first flywheel assembly has masses that are extending away from the center of rotation, the opposing flywheel assembly has masses moving closer to the center of rotation. Thus, the moment of inertia of the first flywheel assembly is increasing while the moment of inertia of the second flywheel assembly is decreasing. While the control motor is in its most central position ("neutral"), the hydraulic control cylinders are also in their central neutral position, and the moments of inertia of both flywheels are equal, and hence their angular velocity is equal. This would cause the angular velocity of the output gear 46 to be zero. If, however, due to inaccuracies or mis-calibration, a small angular rotation exists, since it is coupled to the control nut 68 of the control unit 60, it will drive the position of the control screw 65 and consequently the position of the two hydraulic cylinders 63a,b in a direction opposing the angular velocity of the output of the differential gear 46. This feedback therefore will always drive the control screw towards zero rotation.

The operation is thus that the control motor 64 creates an angular rotation command and the output gear 46 of the kinetic energy storage device will follow this command. The hydraulic control cylinders are subjected to pressure caused by the centrifugal force of their rotating masses. Since they are connected in an opposing manner, the associated force of the cylinder rods of the cylinders 63a, 63b will balanced. However, the centrifugal forces of the masses are non-linear and it is therefore only by the correct shaping of the actuating cam grooves 8a, b in the cam plates 18a, 18b that the balance is achieved by linearizing the associated hydraulic pressures.

From the foregoing it will be seen that this invention is one well adapted to attain all ends and objectives herein-above set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and sub combinations are of utility and may be employed without reference to other features and sub combinations. This is contemplated by and is within the scope of the claims.

What is claimed and desired to be secured by Letters Patent is as follows:

1. A kinetic energy storage device, comprising:
   first and second flywheels, wherein said first flywheel rotates in a first direction and wherein said second flywheel rotates in a second, counter direction, said first and second flywheels each comprising at least one movable fly-weight operable to vary a moment of inertia of the associated flywheel;
   a differential coupled to said first and second flywheels, said differential operable to transfer kinetic energy to and from said flywheels;
   a control mechanism operable to adjust said moveable flyweights simultaneously to vary a moment of inertia of each of said flywheels;
   wherein each of said flywheels includes a movable linkage extending between a control hub and said flyweight, and wherein said control hub is attached to said control rod such that moving said control rod operates said movable linkage to extend or retract said fly-weight away from or towards an axis of rotation of said flywheel.

2. The kinetic energy storage device of claim 1, wherein said differential couples kinetic energy of said first and second flywheels such that an angular rotation of one flywheel is subtracted from an angular rotation of the other flywheel.

3. The kinetic energy storage device of claim 1, wherein said movable linkages comprise stems attached to said flyweights such that said flyweights extend and retract in response to movement of said linkage.

4. The kinetic energy storage device of claim 3, wherein said differential comprises a threaded nut and wherein said control rod comprises a threaded screw portion configured to engage with said nut such that rotating said control rod moves said control rod.

5. The kinetic energy storage device of claim 1, wherein said differential is an epicyclic differential comprising a planetary body.

6. The kinetic energy storage device of claim 1, wherein said planetary body comprises a pulley configured to receive a drive belt.

7. The kinetic energy storage device of claim 1, wherein said control mechanism is operable to adjust said moveable flyweights independently.

8. The kinetic energy storage device of claim 7, wherein said control mechanism comprises first and second control motors located at each of said first and second flywheels and coupled to said flyweight.

9. The kinetic energy storage device of claim 8, wherein said differential is an epicyclic differential comprising a planetary body.

10. The kinetic energy storage device of claim 9, wherein said planetary body comprises a pulley configured to receive a drive belt.

11. The kinetic energy storage device of claim 1, further comprising: a stand configured to receive and support said coupled flywheels, said differential and said control mechanism, said stand comprising at least one kinetic energy source configured to engage with at least one of said flywheels to provide kinetic energy to said flywheel.

12. The kinetic energy storage device of claim 11, wherein said kinetic energy source comprises an electric motor.

13. The kinetic energy storage device of claim 1, further comprising:
a vehicle axle assembly in communication with said differential such that kinetic energy from said flywheels can be transferred to said axle assembly and such that kinetic energy from said axle assembly can be transferred to said flywheels.

14. A kinetic energy storage device, comprising:
first and second flywheels, wherein said first flywheel rotates in a first direction and said second flywheel rotates in a second, counter direction, said first and second flywheel each including at least one movable flyweight operable to vary a moment of inertia of the associated flywheel;
a differential coupled to said first and second flywheels, said differential operable to transmit kinetic energy to and from each of said flywheels;
a control mechanism operable to adjust said movable flywheels simultaneously so as to command kinetic energy transfer from said flywheels such that said flywheels, differential and control mechanism operate as an infinitely variable transmission; and
wherein each of said flywheels includes a movable linkage extending between a control hub and said flyweight, and wherein said control hub is attached to a control rod such that moving said control rod operates said movable linkage to extend or retract said fly-weight away from or towards an axis of rotation of said flywheel.

15. The kinetic energy storage device of claim 14, wherein said first and second flywheels are positioned to rotate about a common axis.

16. The kinetic energy storage device of claim 14, wherein said first and second flywheels each comprise a variable inertia mechanism, said mechanism operable to adjust a moment of inertia of said flywheel.

17. The kinetic energy storage device of claim 16, wherein said variable inertia mechanism comprises repositionable flyweights.

18. The kinetic energy storage device of claim 14, wherein said control mechanism comprises a control rod extending between the variable inertia mechanisms of said first and second flywheels such that movement of said control rod simultaneously adjusts the moment of inertia of both flywheels.

19. The kinetic energy storage device of claim 18, wherein said differential comprises a threaded nut and wherein said control rod comprises a threaded screw engaged with said nut such that rotating said control rod moves said control rod along said axis.

20. The kinetic energy storage device of claim 14, wherein said control mechanism comprises first and second control motors coupled to said first and second flywheels, respectively, said control motors operable to independently adjust the moment of inertia of said flywheels.

21. The kinetic energy storage device of claim 14, wherein said differential is an epicyclic differential aligned axially with said first and second flywheels.

22. The kinetic energy storage device of claim 21, wherein said epicyclic differential comprises a planetary body operable to rotate about said axis such that kinetic energy can be transferred to said flywheels through said planetary body.

23. The kinetic energy storage device of claim 14, further comprising:
a stand configured to receive and support said flywheels, said differential and said control mechanism, said stand comprising at least one kinetic energy source configured to engage with at least one of said flywheels to provide kinetic energy to said flywheel.

24. The kinetic energy storage device of claim 14, further comprising:
a vehicle axle assembly in communication with said differential such that kinetic energy from said flywheels can be is selectively transferred to said axle assembly and such that kinetic energy from said axle assembly can be transferred to said flywheels.

25. The kinetic energy storage device of claim 24, wherein said first and second flywheels are in approximate axial alignment, and wherein said differential is an epicyclic differential coupled there between.

26. A kinetic energy storage device, comprising:
first and second counter-rotating variable inertia flywheels, wherein said first and second flywheels each comprise at least one movable fly-weight and a control mechanism operable to move said fly-weight so as to vary a moment of inertia of the associated flywheel;
wherein said control mechanism is operable to adjust said movable flyweights simultaneously;
a differential coupled to said first and second flywheels, operable to transfer kinetic energy to and from said flywheels; and
a command device coupled to said first and second control mechanisms and operable to vary the moments of inertia of each of said flywheels; and
wherein each of said flywheels includes a movable linkage extending between a control hub and said flyweight, and wherein said control hub is attached to said control rod such that moving said control rod operates said movable linkage to extend or retract said fly-weight away from or towards an axis of rotation of said flywheel.

27. The kinetic energy storage device of claim 26, wherein said command device controls said first and second control mechanism independently.

28. The kinetic energy storage device of claim 26, wherein said first and second control mechanisms are coupled to a control rod, and wherein said command device drives said control rod.

29. The kinetic energy storage device of claim 28, wherein said command device is an electric motor.

30. The kinetic energy storage device of claim 28, wherein said command device is a hydraulic actuator, and wherein said first and second control mechanisms comprise hydraulic motors.

* * * * *